Figure 5:
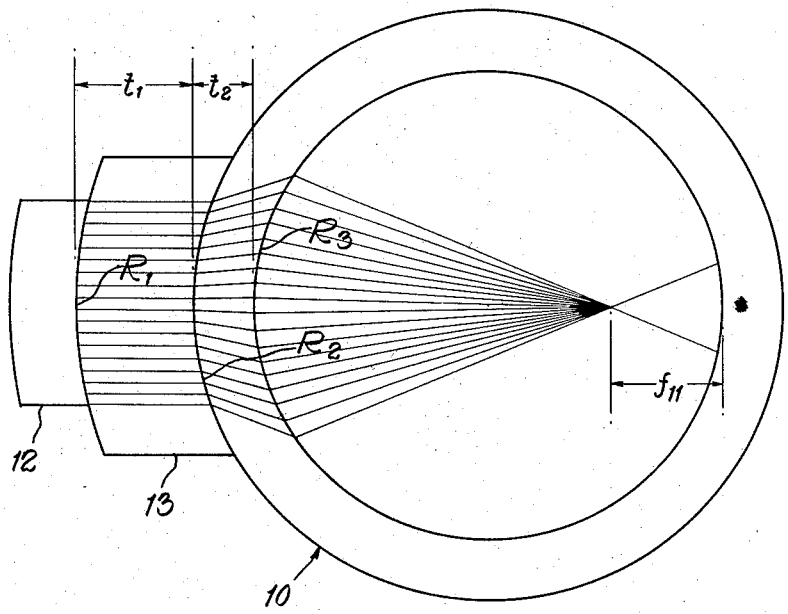

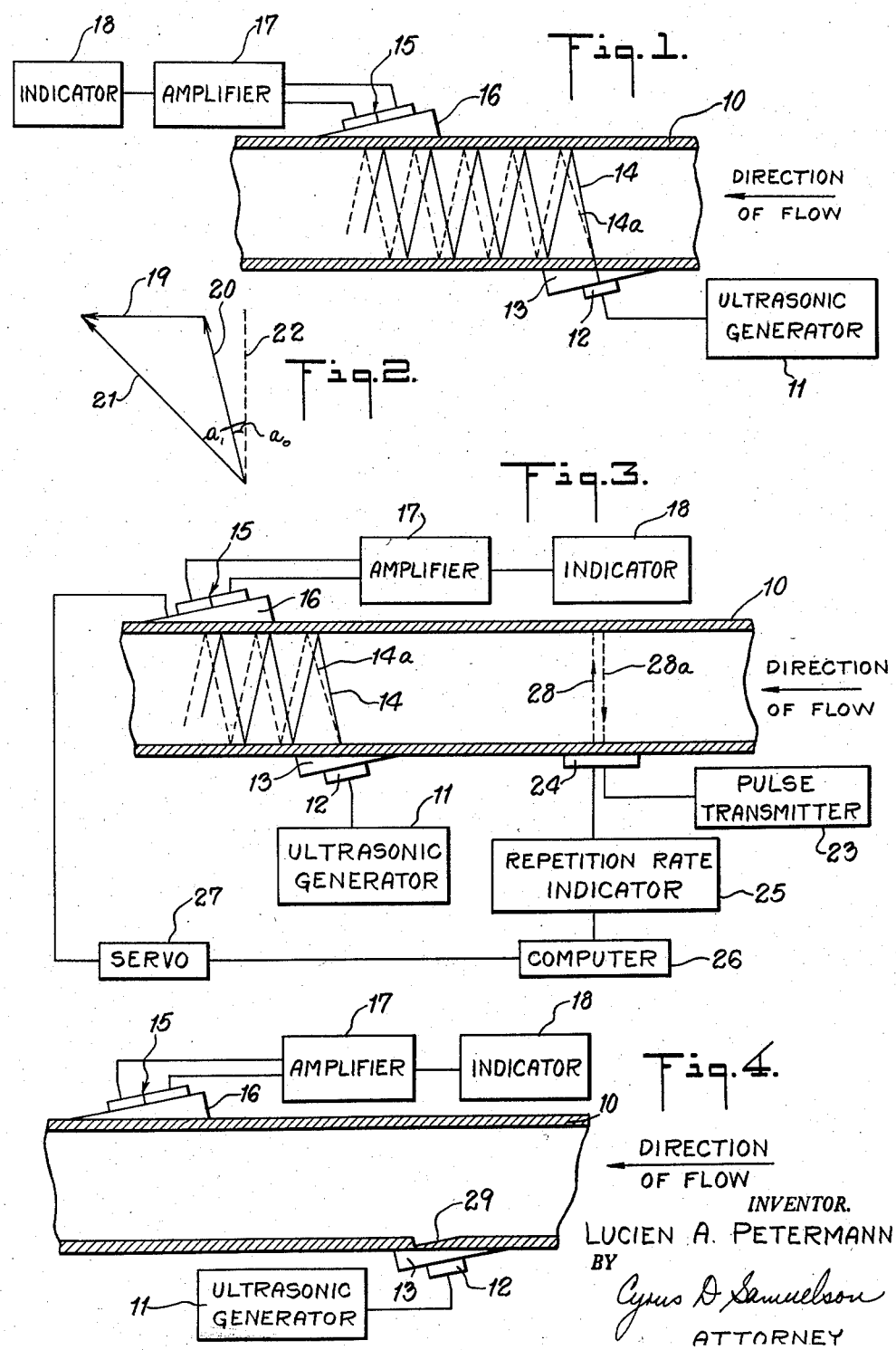

United States Patent Office 2,874,568
Patented Feb. 24, 1959

2,874,568

ULTRASONIC FLOWMETER

Lucien A. Petermann, Metuchen, N. J., assignor to Gulton Industries, Inc., a corporation of New Jersey Application December 7, 1955, Serial No. 551,598

6 Claims. (Cl. 73—194)

My invention relates to the measurement of the velocity of flow of liquids in pipes and in particular to the measurement of such velocities by the use of ultrasonic waves.

At the present time, the measurement of flow velocity of liquids in a pipe utilizing ultrasonic waves is accomplished by utilizing the Doppler effect. These systems employ two transducers mounted inside the pipe so that the direction of ultrasonic wave transmission is essentially parallel to the axis of the liquid flow. The upstream transducer is driven at a given frequency and transmits a beam of ultrasonic energy toward the downstream transducer through the flowing liquid. Due to the motion of the liquid, the Doppler effect will cause the downstream transducer to detect a signal of lower frequency than that transmitted by the upstream transducer. The frequency detected by the downstream transducer is given by the formula:

$$f_1 = \frac{c}{c+v} f_0$$

where $f_1$ is the detected frequency at the downstream transducer, $f_0$ is the frequency transmitted by the upstream transducer, $c$ is the velocity of transmission of ultrasonic waves in the liquid and $v$ is the velocity of flow of the liquid.

If the downstream transducer is employed to transmit the ultrasonic waves, the upstream transducer will detect a signal of higher frequency than that transmitted by the downstream transducer as given by the formula:

$$f_2 = \frac{c}{c-v} f_0$$

where $f_2$ is the detected frequency at the upstream transducer, $f_0$ is the frequency transmitted by the downstream transducer, $c$ is the velocity of transmission of ultrasonic waves in the liquid and $v$ is the velocity of flow of the liquid.

The method just described utilizes this effect for both short pulses or continuous waves of ultrasonic energy. It is necessary that accurate measurement be made of the frequency differences so that the flow velocity $v$ may be calculated accurately. In water, the velocity of transmission of ultrasound $c$ is approximately equal to $1.48 \times 10^5$ cm./sec. so that a very high liquid velocity flow of the order of 1000 cm./sec. will produce a frequency difference of only 0.7%. So that in order to determine the flow velocity with an accuracy of 5%, the accuracy of frequency determination must be within an accuracy of 0.01% and must be even better for low flow velocities. Frequency determinations with such a degree of accuracy require extremely accurate and expensive frequency meters.

Furthermore, it is very difficult to achieve accurate frequency determination when short-pulse ultrasonic techniques are employed. This is due to the fact that the frequency spectrum of a short pulse is very wide and is very frequently wider than 0.01% of the nominal carrier frequency. This makes it difficult, if not impossible, for one to distinguish between two carrier frequencies which are close together.

In order to use existing flow meters it is necessary to install some of the measuring apparatus in the flowing liquid itself. This leads to inaccuracies in measurement due to the disturbance caused by the inserted measuring apparatus and increases the maintenance problems. In addition, there is the possibility that some of the apparatus may be worked loose and carried away by the flowing liquid. When this occurs, it is necessary to stop the flow in order to make the necessary repairs.

It is, accordingly, a principal object of my invention to provide simple, economical ultrasonic apparatus for the accurate determination of liquid flow velocities in pipes.

It is a further object of my invention to provide ultrasonic apparatus which will measure the average flow velocity of liquids in pipes.

It is a still further object of my invention to provide ultrasonic apparatus which will measure the average flow velocity of a fluid without placing any of the apparatus in the pipe or other flow container.

Other objects and advantages of my invention will be apparent during the course of the following description.

In the accompanying drawings, forming a part of this application, and in which like numerals are employed to designate like parts throughout the same, Figure 1 is a longitudinal view, partly in section, of a pipe in conjunction with which, apparatus illustrating one embodiment of my invention is employed to measure the flow of liquid in said pipe, Figure 2 is a vector diagram which serves to illustrate the theory underlying my invention, Fig. 3 illustrates a further embodiment of my invention applied to a pipe which is in section, Figure 4 illustrates a further embodiment of my invention whereby refractions at the boundary of the pipe wall and the pipe interior are eliminated, and Figure 5 is a cross-sectional view of the pipe and serves to further illustrate the theory underlying my invention.

In the drawings, wherein for the purpose of illustration, are shown preferred embodiments of my invention, the numeral 10 designates a pipe in which the flow of liquid is to be measured. In Figures 1, 3 and 4, ultrasonic generator 11 is employed to excite transducer 12 which is mounted on wedge 13. Differential transducer 15 is mounted on wedge 16 and the electrical output of 15 is fed to amplifier 17 and thence to indicator 18. The velocity of flow of liquid in the pipe is represented by vector 19 (Figure 2), the velocity of ultrasonic waves in the pipe with no liquid flow is represented by vector 20 and that with liquid flow is represented by 21. The numeral 22 designates the direction normal to the pipe walls. Angle $a_0$ designates the angle between 22 and 20 and angle $a_1$ designates the angle between 22 and 21. In Figure 3, pulse transmitter 23 excites transducer 24 which transmits ultrasonic energy normal to the pipe walls, the transmitted path being designated as 28 and the return path as 28a. The return pulse 28a is fed to repetition rate indicator 25, thence to computer 26 and thence to servo 27 which is utilized to adjust the position of 16 within small limits so that correction may be made for changes in the velocity of ultrasound in the liquid.

In Figure 4, notch 29 is made on the wall of pipe 10 in order to avoid the effects of refraction at the inner surface of the pipe wall. A similar notch may also be utilized in conjunction with the differential transducer 15 but it is neither as necessary nor as important as the one used in conjunction with transmitting transducer 12.

Figures 1 and 2 serve to illustrate the basic principle of my invention, Figure 1 being an illustration of an embodiment of my invention and Figure 2 being a vector diagram which serves to explain the underlying theory of my invention.

A beam of ultrasound will be deflected if the medium of transmission moves in much the same manner as a bullet will be deflected due to the blowing of the wind. Transducer 12 is mounted on wedge 13 on the outside of pipe 10 so that when there is no liquid flow, the propagation of ultrasonic energy will be along the path designated as 14. Differential transducer 15 is mounted on wedge 16 on the outside of pipe 10 in a position at which it will receive the ultrasonic energy transmitted by 12. The electrical output of 15 is fed to amplifier 17 and thence to indicator 18. The electrical output of differential transducer 15 is determined, among other things, by the position of the beam of ultrasonic energy striking it, as described in my copending application Serial No. 551,599, filed December 7, 1955. When there is liquid flow in the direction indicated by the arrow, the propagation of ultrasonic energy in pipe 10 will be along the path 14a and it will reach transducer 15 in a different position from that of 14. As the liquid flow velocity in the pipe changes, the position of path 14a changes so that a different effect is produced upon transducer 15 and a different indication is shown on 18. The two halves of trandsucer 15 are connected so that their outputs, when fed to the inputs of 17, will be opposite in phase. In such a case, the output of 17, which comprises the combined signals is applied to the inputs, will read zero when equal signals are applied to the input. This is due to the fact that the signals are opposite in phase and cancel out. This phase opposition may be accomplished within amplifier 17, by opposite polarization of the two halves of 15 or by electrically connecting the sections of 15 so that their outputs are opposite in phase.

My invention provides means for measuring the average velocity of liquid flow in pipe 10, said average being close to the actual average obtained by dividing the amount of liquid flowing per unit time by the cross-sectional area of the pipe. Previous ultrasonic measuring methods give the velocity along a narrow "tube of flow" which is usually very different from the actual average velocity.

Considering the vector diagram of Figure 2, 20 is the vector representing the velocity of propagation of the ultrasound without liquid flow. The angle $a_0$ is that between 20 and the normal to the pipe walls 22. Vector 19 represents the velocity of liquid flow and vector 21 represents the velocity of the propagation of ultrasound with liquid flow. The angle $a_1$ is that between 21 and 22. The change in angle of propagation $$a_1 - a_0 = \text{arc tan} \frac{\frac{V}{V_0} \cos a_0}{1 + \frac{V}{V_0} \sin a_0}$$

where V is the velocity of liquid flow, and $V_0$ is the velocity of propagation of ultrasound in the liquid without liquid flow. When $$\frac{V}{V_0}$$

is small, $a_1 - a_0$ is approximately equal to $$\frac{V}{V_0} \cos a_0$$

Transducer 12 is cemented or otherwise suitably attached to coupling wedge 13 whose angle is chosen so that the ultrasonic beam 14 will be propagated at a proper angle within pipe 10. The angle of propagation of beam 14 must be large enough to avoid standing waves within pipe 10 and small enough so that the lateral distance between 12 and 15 is not too large. 15 is mounted to wedge 16 in a similar manner to that described for transducer 12 and presenting a similar angle to pipe 10 as heretofore described for transducer 12 and wedge 13. Wedges 13 and 16 may be made of metal, plastic or any other substantially rigid material so long as the attenuation of ultrasound in the material is small.

The ultrasonic frequency should be low in order to avoid too much absorption and should be as high as possible to avoid a wide beam angle due to diffractive effects. The frequency chosen must take these essentials into account and is further dependent upon the beam dimensions and the sensitivity of the receiving system. It may be necessary to grind the inner walls of the pipe smooth over the distance in which the ultrasonic transmission is to take place in order to provide suitable reflective characteristics for the ultrasonic frequency chosen for use. Due to the cylindrical curvature of the pipe walls, there will be a focusing effect on the beam at each reflection in addition to the aberrations due to the cylindrical shape of the walls. These latter abberations will occur mainly in the direction perpendicular to the axis of the pipe.

Focusing of the ultrasonic beam occurs at the interface of wedge 13 and the wall of pipe 10 and at the interface of the wall of pipe 10 and the liquid. The focusing at the interface of 13 and the wall of 10 is by refraction, the focusing at the interface between the wall of 10 and the liquid is also by refraction, and the focusing at the successive interactions of the beam with the pipe wall is produced by reflection.

First, I shall consider the focusing by refraction. For the purpose of analysis (see Figure 5):

$R_1$ = the radius of curvature of transducer 12
$R_2$ = the radius of curvature of the outside wall of pipe 10
$R_3$ = the radius of curvature of the inside wall of pipe 10
$t_1$ = the thickness of wedge 13 at the center of transducer 12
$t_2$ = wall thickness of pipe $10 = R_2 - R_3$
$u_1$ = velocity of ultrasound in wedge 13
$u_2$ = velocity of ultrasound in wall of pipe 10
$u_3$ = velocity of ultrasound in the liquid
$f_{11}$ = the distance of the first focal point from the inner wall of the pipe opposite the entrance of the beam in pipe 10.

$$f_{11} = R_3 \left[ 1 - \frac{u_3}{u_1} R_2 \frac{t_1 + R_2 - R_1}{(t_1 - R_1)\left[R_3 + \frac{u_2}{u_1}(R_2 - R_3) - \frac{u_3}{u_1}R_2\right] + \frac{u_2}{u_1}R_2\left[R_2 - R_3 - \frac{u_3}{u_2}R_2\right]} \right]$$

It can therefore be seen that it is possible, within reasonable limits, to obtain convenient focus by refraction within pipe 10 by suitable selection of the values of $R_1$, $t_1$, and $u_1$.

A preferred embodiment is one wherein the first focal point falls on the axis of pipe 10. This is accomplished when transducer 12 is curved and its curved surfaces are concentric with the walls of pipe 10. The ultrasonic beam is thereby kept narrow even after multiple reflections inside pipe 10. The only beam spread effects are due to diffraction and the turbulence of the liquid flow.

I will now consider the ultrasonic focusing due to reflection from the inner walls of pipe 10. The ultrasonic beam will undergo a focusing effect at each reflection because of the curvature of the walls of pipe 10.

$f_{n1}$ = the distance of the $n^{th}$ focal point from the inner wall of pipe 10 opposite the entrance of the beam in pipe 10 after the $(n-1)^{th}$ reflection
$R_3$ = inside radius of pipe 10

$$f_{n1} = R_3[1 - (-1)^n K_n]$$

where $$K_n = \frac{f_{11} - R_3}{2(n-1)f_{11} - (2n-3)R_3}$$

It can be seen that regardless of the value of $f_{11}$, $f_{n1}$ approaches $R_3$ as $n$ approaches $\infty$. However, the width of the ultrasonic beam tends to increase until it occupies the whole section of pipe 10 unless $f_{11}$ and $n$ are properly chosen. If the beam occupies the entire section of pipe 10, there may well be too little ultrasonic intensity at the receiver. In addition, the wider the beam is, the more distorted the wavefront is due to the increase in cylindrical aberrations.

I shall now discuss the combined effects of focusing by refraction and reflection. We may desire a collimated beam (parallel beam) before the $n^{\text{th}}$ reflection in pipe 10, $f_{n1}=\infty$ or $K_n=\infty$ which gives the relation:

$$2(n-1)f_{11} - (2n-3)R_3 = 0$$

or $$f_{11} = \frac{2n-3}{2(n-1)} R_3 = R_3 \left[ 1 - \frac{1}{2(n-1)} \right]$$

The following relationship must be satisfied:

$$2(n-1) = \frac{u_1}{u_3} \frac{1}{R_2} \frac{(t_1-R_1)\left[R_3 + \frac{u_2}{u_1}(R_2-R_3) - \frac{u_3}{u_1}R_2\right] + \frac{u_2}{u_1}R_2\left(R_2 - R_3 - \frac{u_3}{u_2}R_2\right)}{(t_1-R_1)+R_2}$$

Since $(t_1-R_1)$ appears in this expression and neither $t_1$ nor $R_1$ appears separately, it is sufficient to keep $(t_1-R_1)$ constant over the whole transducer 12 to maintain the proper conditions. In order to keep $(t_1-R_1)$ constant it is necessary for $R_1$ to vary throughout the length of transducer 12 because $t_1$ varies throughout the length of wedge 13.

On the other hand, it may be desired to focus the beam on the receiving transducer at the point at which the $n^{\text{th}}$ reflection takes place; and in this second case:

$$f_{n1} = 0 \text{ or } K_n = (-1)^n$$

which gives $$f_{11} = \left[ 1 - \frac{1}{2(n-1)-(-1)^n} \right] R_3$$

This value of $f_{11}$ is combined with that relating $f_{11}$ to the dimensions and properties of the pipe and wedge, giving the relation on which we may base the design of the wedge and the transducer.

Following is a third case, of particular interest:

If the physical characteristics are selected so that $f_{11}=R_3$, then $K_n=0$ and $f_{n1}$ will be equal to $R_3$ regardless of the value of $n$. This condition exists when all surfaces are concentric but since $t_1$ is variable, the transducer cannot be a simple cylindrical section and it is therefore necessary to use an expensive transducer in order to obtain a beam with the best conditions of narrowness, which also gives the best efficiency for the overall transmission from transmitter to receiver.

In order to calculate the total displacement of the ultrasonic beam from the position with no liquid flow to that with liquid flow, it is necessary to multiply the change in angle by the total path length. For example, with water flowing at 100 cm./sec. and with a total path length of 400 cm., the total displacement will be approximately 3 mm. This small displacement can not be detected by ordinary methods but may be detected by the use of a differential receiving transducer such as has been described in my co-pending patent application.

A practical example of the utility of my invention follows, it being understood that this practical example is merely illustrative of the use and operation of the invention and is not to be considered as restricting the invention to this example. Let water flow in a pipe which is 12" in diameter and further, let the permissible attenuation be 60 db and the number of reflections to be used between transducers 12 and 15 be 10. From the attenuation requirements and the known properties of water, we find that an ultrasonic frequency of 6 mc. is suitable. The matter of diffraction must be considered also. The diameter of the main lobe of the ultrasonic beam should not exceed twice the diameter of the transducer after it has traversed the path length of 400 cm. At 6 mc. we chose a transducer diameter of 2" and a consequent main lobe diameter at 15 of 4". With a liquid flow velocity of 100 cm./sec., a displacement of 3 mm. will be obtained at the receiver.

This small displacement will be detected by differential transducer 15 in accordance with the methods described in my co-pending application and will be indicated on the indicator 18. Any of the various types of differential transducers described in my co-pending patent application along with the various indicating methods likewise described may be utilized in this connection.

It should be noted that my invention possesses great advantage over the previously known methods of flow measurement by ultrasonic means. In the older systems, the measurement of the flow velocity depends on an accurate measurement of frequency or of frequency differences whereas in my system, the measurement of flow velocity depends on measurements of voltages or differences in voltages at frequencies at which amplification and relatively insensitive indicators may easily be employed. Pulsed ultra sound is not essential to the use of my system and the electronic system is thereby simplified.

The position of transducer 15 should be such that both sections of the transducer 15 receive equal ultrasonic energy when there is no liquid flow in the pipe. Since the velocity of propogation of ultrasound varies with wide temperature changes or with changes in the type of liquid flowing, it is necessary to adjust the position of transducer 15 depending upon the change in liquid constants. This can be accomplished by the system illustrated in Figure 3. There are other methods similar to that of Figure 3 which may also be used.

With no liquid flowing but with pipe 10 full of liquid, transducer 12 is excited by ultrasonic generator 11 and transducer 15 is moved until indicator 18 shows that the two sections of 15 are receiving equal amounts of ultrasonic energy. The liquid flow is then started and the indicator 18 will indicate the flow based on the difference in the amount of ultrasonic energy which is impinged upon the two sections of 15.

Transducer 24 is mounted on the upstream side of transducer 12 such that it transmits ultrasonic signals 28 normal to the pipe surfaces. The ultrasonic signals 28 are of different frequency from those transmitted by transducer 12. When a pulse is transmitted along the path 28, it is reflected by the pipe wall at the far side and returns to transducer 24 along the path 28a after a time interval which is inversely proportional to the velocity of propagation of ultrasonic energy in the liquid. The deflection due to liquid flow in the pipe is negligible in this case. This echo produces an electric pulse on transducer 24 which is utilized to trigger the pulse transmitter 23. The repetition rate of these pulses is proportional to the velocity of propagation of ultrasound in the liquid. The repetition rate may be counted on repetition rate indicator 25 and the propagation velocity calculated. If it is desired, the output of 25 may be fed to computer 26 and thence to servo 27 so that the position of transducer 15 is adjusted along pipe 10 in accordance with the velocity of propagation of ultrasound in the liquid. For example, pipe 10 in Figure 3 may be slotted to receive a rail carried by wedge 16 so that 16 moves along 10 as described above (details not shown). Alternatively, 15 may be mounted on a plate carrying a rail which rides in slots in 16 so that 15 is moved with respect to 16 under the urging of signals from 27 (details not shown).

Another method for avoiding the effects due to the change in the velocity of propagation of ultrasound in the liquid is to cut a notch 29 parallel to the wavefront of the beam inside of the pipe wall. Since this permits the ultrasonic energy to enter the liquid normal to the surface of the wall of pipe 10, the more serious effects of changes in the velocity of propagation of ultrasound in the liquid are avoided. For the same angle of propagation of the ultrasonic beam within the pipe 10, the use of notch 29 will permit the angle of wedge 13 to be much smaller with a resultant improvement in propagation, transmission efficiency and less dependence on mode conversion.

While I have described my invention by means of specific examples and in specific embodiments, I do not wish to be limited thereto, for obvious modifications will occur to those skilled in the art without departing from the spirit of the invention or the scope of the subjoined claims.

Having thus described my invention, I claim:

1. An ultrasonic flowmeter comprising fluid flow containing means; a transducer affixed to said fluid flow containing means; a source of ultrasonic energy connected to and exciting said transducer; a differential receiving transducer comprising at least two sections affixed to said fluid flow containing means; said differential receiving transducer being positioned on said fluid flow containing means so as to receive ultrasonic energy transmitted across said fluid flow containing means after a plurality of reflections within said fluid flow containing means; amplifying means and indicating means; the outputs of said sections of said differential receiving transducer being fed to said amplifying means; the output of said amplifying means being fed to said indicating means; said differential transducer, amplifying means and indicating means being adjusted in phase so that there is a null indication with no fluid flow in said fluid flow containing means.

2. An ultrasonic flowmeter comprising a pipe; a source of ultrasonic energy; a transducer connected to and excited by said source of ultrasonic energy; a first wedge of material with low ultrasonic attenuation characteristics; said transducer being attached to said first wedge of material with low ultrasonic attenuation characteristics; said first wedge being attached to the outer surface of the pipe through which the flow of material is to be measured; a second wedge with low ultrasonic attenuation characteristics, laterally displaced from said first wedge along said pipe and attached to said pipe; a differential transducer attached to said second wedge; amplifying means and indicating means; the angles of said wedges being such that the resultant ultrasonic beam transmitted by said transducer is transmitted across said pipe such that after it undergoes a plurality of reflections within said pipe it is impinged upon said differential transducer; said differential transducer comprising at least two sections; the outputs of said sections being connected to said amplifying means and thence to said indicating means; said differential transducer, amplifying means and indicating means being adjusted in phase so that there is a null indication with no fluid flow in said pipe.

3. An ultrasonic flowmeter comprising a pipe; a source of ultrasonic energy; a first transducer connected to and excited by said source of ultrasonic energy; a first wedge of material with low ultrasonic attenuation characteristics; said first transducer being attached to said first wedge of material with low ultrasonic attenuation characteristics; said first wedge being attached to the outer surface of the pipe through which the flow of material is to be measured; a second wedge with low ultrasonic attenuation characteristics, laterally displaced from said first wedge along said pipe and attached to said pipe; a second transducer being a differential transducer attached to said second wedge; the angles of said wedges being such that the resultant ultrasonic beam transmitted by said first transducer is impinged upon the surface of said differential transducer; amplifying means and indicating means; said beam being transmitted across said pipe such that it undergoes a plurality of reflections prior to being impinged on said differential transducer; said differential transducer comprising at least two sections; the outputs of said sections being connected to said amplifying means and thence to said indicating means; said differential transducer, amplifying and indicating means being adjusted in phase so that there is a null indication with no fluid flow in said pipe; a third transducer laterally displaced along said pipe from said first transducer; said third transducer being attached to said pipe such that its main transmission direction is perpendicular to the walls of said pipe; pulse transmission means exciting said third transducer; the return pulse actuating said pulse transmission means; and pulse repetition indicating means actuated by said return pulse.

4. An ultrasonic flowmeter as described in claim 2 wherein the portion of the inner surface of the wall of said pipe in the direct path of the ultrasonic transmission from said transducer excited by said source of ultrasonic energy is substantially parallel to the wavefront of the ultrasonic beam inside said pipe wall.

5. An ultrasonic flowmeter as described in claim 3 including computer and servo means wherein the return pulse from said third transducer actuates said computer and servo means; said computer means being actuated by said return pulse and in turn actuating said servo means; said servo means controlling the position of said differential transducer laterally along said pipe in accordance with the repetition rate indicated on said pulse repetition indicating means.

6. An ultrasonic flowmeter as described in claim 3 wherein the portion of the inner surface of the wall of said pipe in the direct path of the ultrasonic transmission from said first transducer is substantially parallel to the wavefront of the ultrasonic beam inside said pipe wall.

References Cited in the file of this patent

UNITED STATES PATENTS

| | | |
|---|---|---|
| 2,051,032 | Eddy | Aug. 18, 1936 |
| 2,724,269 | Kalmus | Nov. 22, 1955 |